Patented Aug. 24, 1937

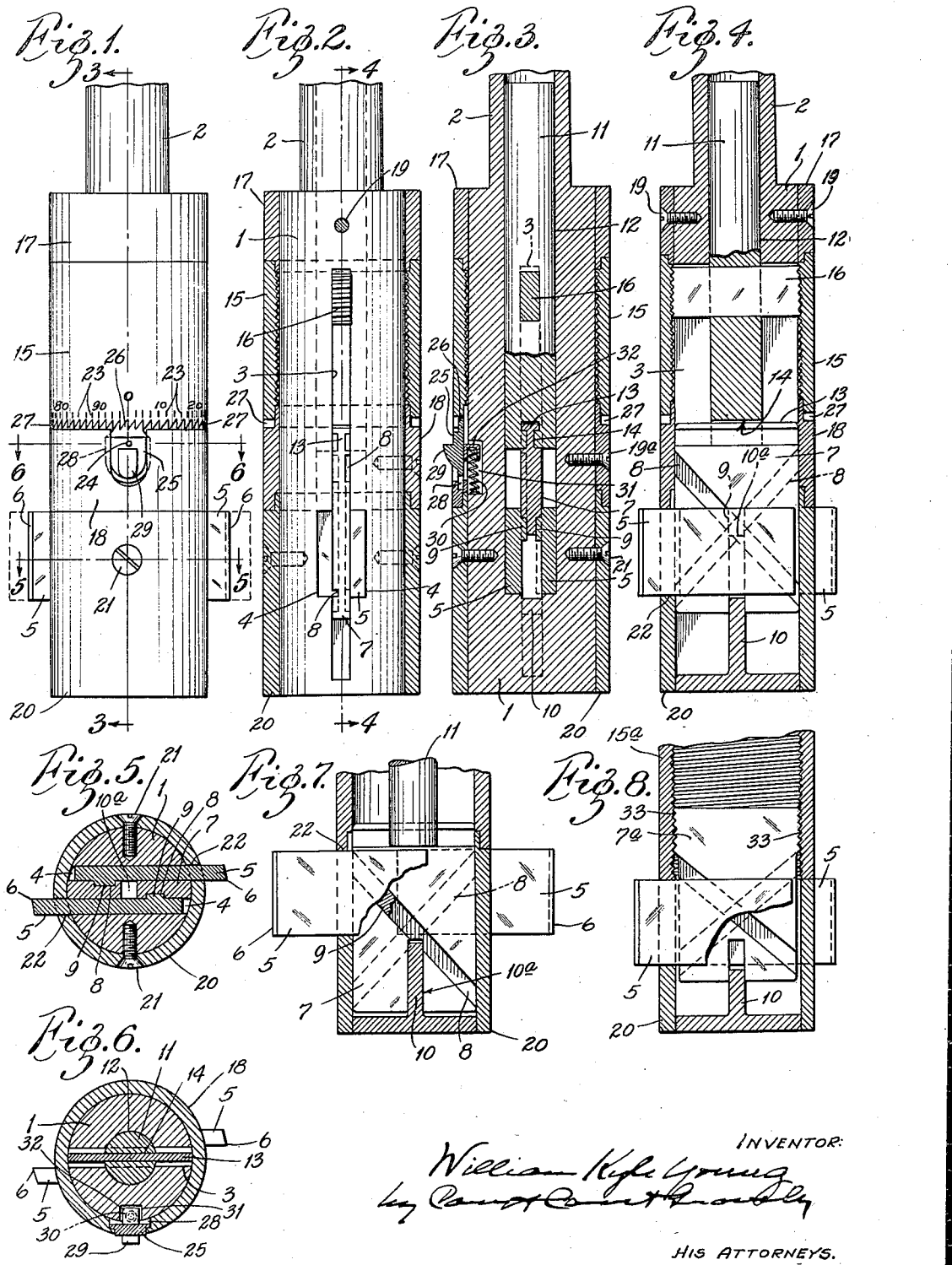

2,090,718

UNITED STATES PATENT OFFICE 2,090,718

BORING TOOL

William Kyle Young, Rockford, Ill.

Application January 5, 1934, Serial No. 705,307

6 Claims. (Cl. 77—58)

This invention relates to boring tools of the kind having removable blades capable of simultaneous action and adjustment. It has for its principal objects to provide for the ready removal and replacement and accurate adjustment of the blades; to provide for holding the blade adjusting member in the desired position of adjustment; and to provide for simplicity and economy of construction and compactness of design. The invention consists in the boring tool and in the combinations and arrangements of parts hereinafter described and claimed.

In the accompanying drawing, which forms part of this specification and wherein like symbols refer to like parts wherever they occur, Fig. 1 is a side elevation of a boring tool embodying my invention, Fig. 2 is a view looking at the slotted side of the tool, with the main body portion of the tool shown in elevation and the sectional covering sleeve therefor shown in longitudinal section, Fig. 3 is a longitudinal section on the line 3—3 in Fig. 1, Fig. 4 is a longitudinal section on the line 4—4 in Fig. 2, Fig. 5 is a transverse section on the line 5—5 in Fig. 1, Fig. 6 is a transverse section on the line 6—6 in Fig. 1, Fig. 7 is a view similar to Fig. 4 showing the blades at the limit of their outward movement; and Fig. 8 is a view, similar to Fig. 7, illustrating a modified construction of boring tool.

The boring tool shown in Figs. 1 to 7, inclusive, of the accompanying drawing comprises a cylindrical main body portion 1 provided at its inner end with a suitable shank portion 2 adapted for cooperation with a suitable machine tool (not shown). Said body portion is provided with a diametrical slot 3 that extends longitudinally thereof and terminates short of the ends thereof. Near the outer end of the tool the slot 3 is widened to form opposed recesses 4 adapted to support a pair of blades 5 for sliding movement transversely of the tool axis. The blades are of rectangular shape, project on opposite sides of the reamer and are provided at their outer ends with suitable cutting edges 6.

The blades 5 are projected from and drawn into their supporting recesses or slideways 4 by means of a rectangular operating plate 7 mounted in the longitudinal diametrical slot for sliding movement lengthwise thereof. This operating plate is interposed between the two blades 5 and is provided on each side face with an oblique groove 8 that extends from one corner of the plate to the diagonally opposite corner thereof. The oblique groove on one side of the plate is arranged at a reverse or right angle to the corresponding groove on the other side of said plate. The blades 4 are provided on their plate contacting faces with oblique ribs 9 that slidably engage the grooves 8 in the respective side faces of the operating plate 7. With this arrangement, when the operating plate 7 is slid longitudinally in the slot 3 toward the outer end thereof, the blades 5 are projected outwardly; and when said plate is slid in the opposite direction in said slot, the blades are retracted.

The portion of the slot 3 located outwardly of the enlarged blade receiving recesses 4 thereof is provided at the axis of the tool with a web 10 that is disposed crosswise of the operating plate 7; and the outer end of said operating plate is provided midway of its side edges with a notch 10a adapted to straddle said web when the blades are projected. With this arrangement, when the blades are projected, the notch 10a in the operating plate 7 straddles the web 10 and thus prevents said plate and said blades from being withdrawn from the slot 3. In the retracted position of the blades, the notch 10a in the plate 7 is clear of the web 9, thereby permitting the plate, together with the blades engaged therewith to be withdrawn from the slot 3.

The operating plate 7 is slid longitudinally in the slot 3 to retract or project the blades 5 by means of a cylindrical plunger 11 that is mounted for longitudinal sliding movement in an axial bore 12 provided therefor in the body member 1 of the tool. The plunger supporting bore 12 leads inwardly from the inner or shank end of the tool and is preferably of a diameter corresponding to the width of the widened portion 4 of the slot 3. The connection between the operating plate 7 and the plunger 11 comprises a longitudinal rib 13 on the inner end of said operating plate that slidably fits a T-shaped transverse groove 14 in the adjacent end of said plunger. By this arrangement, the plate 7 may be readily disengaged from the plunger 11 and removed from the slot 3 by sliding said plate lengthwise of its rib and groove connection with said plunger.

The plunger 11 is shifted axially in the body member 1 by means of a rotatable adjusting sleeve 15, which is threaded internally for cooperation with the threaded outer ends of a cross bar 16 mounted in a transverse opening provided therefor in said plunger. The rotary adjusting sleeve 15 is held against endwise movement on the body member 1 by means of stop sleeves 17 and 18 sleeved on said body member at opposite ends of said adjusting sleeve. The stop sleeve 17 at the inner end of the adjusting sleeve 15 is secured in position by means of screws 19; and the stop sleeve 17 at the outer end of said adjusting sleeve is secured in position by means of screws 19a. The portion of the body member 1 located beyond the outermost abutment sleeve is provided with a sleeve 20, which is secured in position by means of screws 21 and is provided at its inner end with notches 22 adapted to accommodate the blades 5. With this arrangement, the sleeves 15, 17, 18 and 20 form a sectional casing for the body member that covers the narrow portion of the diametrical slot 3 from end to end thereof and thus prevents material from entering said slot and interfering with the adjustment of the blades.

The threaded adjusting sleeve 15 is provided at its outer end with circumferentially spaced graduations 23 adapted to cooperate with an index mark 24 for indicating the diameter for which the blades of the boring tool are adjusted. The sleeve 15 is held in desired position of rotary adjustment by means of a catch or detent 25 which is provided with teeth 26 adapted to cooperate with a series of teeth 27 cut in the graduated end of the adjusting sleeve. The spacing of the teeth 27 in the graduated end of the sleeve 15 corresponds to the spacing of the graduations thereon. The catch 25 seats within a notch 28 provided therefor in the outermost abutment sleeve 18 with its margins extending beneath the marginal edges of said notch. The outer face of the catch 25 is provided with a finger lug 29 and is yieldably held in engagement with the adjusting sleeve 15 by means of a coil spring 30, which is mounted in a recess 31 provided therefor in the body portion 1 of the tool with one end in abutting relation to said recess and with its other end seated within a recess provided therefor in a lug 32 on the inner face of said catch. With this arrangement, the adjusting sleeve 15 is normally held against accidental rotation by the catch 25 which may be readily disengaged from said sleeve to permit rotation thereof.

In the modified construction shown in Fig. 8, the opposite edges of the operating plate 7a are provided near the inner end thereof with threads 33 adapted for cooperation with the internal threads of the adjusting sleeve 15a. This arrangement dispenses with the axially slidable plate operating plunger 11 and enables the length of the tool to be considerably shortened.

The hereinbefore described boring tool has numerous advantages. It is strong and durable and of compact design and of neat appearance. The blades are easily and accurately adjusted and may be readily inserted in and removed from the tool, the sleeves serve to cover the elongated diametrical slot in the body member and thus prevent articles of dirt or metal from getting into the slot and interfering with the operation and adjustment of the tool; and the spring-pressed catch serves as a simple and efficient means for holding the adjusting sleeve in the desired position of adjustment.

Obviously, the hereinbefore described boring tool admits of considerable modification without departing from the invention. Therefore, I do not wish to be limited to the precise construction shown and described. For instance, the angularity of the cooperating grooves and ribs of the blades and the operating plate may be varied within wide limits, and the grooves may be in the blades rather than in the operating plate.

What I claim is:

1. A boring tool comprising a body portion provided with an elongated slot that extends therethrough from side to side thereof, a plate slidable lengthwise in said slot, blades mounted in said slot against longitudinal movement therein on opposite sides of said plate, connections between the opposing side faces of said plate and said blades for moving said blades transversely of said body portion when said plate is moved longitudinally of said slot, and means for actuating said operating plate, said means comprising an internally threaded sleeve surrounding and rotatably mounted on said body portion, means for preventing axial movement of said sleeve relative to said body portion and threads on the longitudinal edges of said plate cooperating directly with the internal threads on said sleeve.

2. A boring tool comprising a cylindrical body member having an elongated diametrical slot whose opposite walls are provided with a widened portion forming seats, blades mounted in said seats, an operating plate mounted in said slot between said blades, said operating plate having reversely inclined oblique grooves in its respective blade engaging sides and said blades having oblique ribs adapted to seat in said grooves, means for sliding said plate endwise in said slot, said means comprising a plunger mounted in said body member for axial sliding movement therein and having a connection with said plate, a cross-bar mounted in said plunger and extending on opposite sides thereof into said slot and provided at its ends with threads, and a sectional casing for said body member comprising an internally threaded sleeve rotatably mounted on said body member and cooperating with the threaded ends of said bar, sleeves secured to said body member at opposite ends of said internally threaded sleeve for preventing endwise movement thereof, and a sleeve mounted on said body member and provided with notches adapted to accommodate said blades.

3. A boring tool comprising a cylindrical body member having an elongated diametrical slot whose opposite walls are provided with a widened portion forming seats, blades mounted in said seats, an operating plate mounted in said slot between said blades, said operating plate having reversely inclined oblique grooves in its blade opposing sides and said blades having oblique ribs adapted to seat in said grooves, means for sliding said plate endwise in said slot, said means comprising a plunger mounted in said body member for axial sliding movement therein and having a connection with said plate, a cross-bar mounted in said plunger and provided at its ends with threads, a sectional casing for said body member comprising an internally threaded sleeve rotatably mounted on said body member and co-operating with the threaded ends of said bar, sleeves secured to said body member at opposite ends of said internally threaded sleeve for preventing endwise movement thereof, and a sleeve mounted on said body member and provided with notches adapted to accommodate said blades, said internally threaded sleeve being provided at one end with a series of circumferentially spaced graduations and a series of correspondingly spaced teeth, and a catch slidably mounted on the abutment sleeve adjacent to said end of said adjusting sleeve and provided with teeth adapted to cooperate with the teeth of the latter.

4. A boring tool comprising a one-piece cylindrical body portion provided intermediate between its ends with an elongated diametral slot, a plate mounted in said slot for sliding movement longitudinally of said body portion, a blade mounted in said slot alongside of said plate and provided at one end with a cutting edge, a connection between said plate and said blade for moving the latter transversely of said body portion when said plate is moved longitudinally thereof, and a cylindrical casing surrounding said body portion and provided with an opening adapted to slidably support said blade beyond said body portion and to resist movement of said blade in all directions transversely of the sliding movement without interfering with said sliding movement, said casing covering said slot in said body portion, the plate in said slot and the end of said blade remote from the cutting edge thereof.

5. A boring tool comprising a one-piece cylindrical body portion provided intermediate between its ends with an elongated diametral slot, a plate mounted in said slot for sliding movement longitudinally of said body portion, a blade mounted in said slot alongside of said plate and provided at one end with a cutting edge, a connection between said plate and said blade for moving the latter transversely of said body portion when said plate is moved longitudinally thereof, and a cylindrical casing surrounding said body portion and provided with an opening adapted to slidably support the cutting end of said blade, said casing covering said slot in said body portion, the plate in said slot and the end of said blade remote from the cutting edge thereof, said casing comprising a plurality of sections arranged end to end in abutting relation, one section of said casing being rotatable on said body portion and operatively connected to said plate to actuate the same, said rotary casing section being provided at one end with a series of circumferentially spaced graduations for indicating the diameter for which the tool is set and a series of correspondingly spaced teeth, and a spring-pressed catch mounted in a recess provided therefor in said tool for sliding movement towards and away from said end of said rotary casing section and provided with teeth adapted to cooperate with the teeth thereof.

6. A boring tool comprising a one-piece cylindrical body portion provided intermediate between its ends with an elongated diametral slot, a plate mounted in said slot for sliding movement longitudinally of said body portion, a blade mounted in said slot alongside of said plate and provided at one end with a cutting edge, a connection between said plate and said blade for moving the latter transversely of said body portion when said plate is moved longitudinally thereof, a cylindrical casing surrounding said body portion and provided with an opening adapted to slidably support the cutting end of said blade, said casing covering said slot in said body portion, the plate in said slot and the end of said blade remote from the cutting edge thereof, said casing comprising a plurality of sections arranged end to end against endwise movement relative to said body portion, one section of said casing being rotatable on said body portion and provided with internal threads adapted to cooperate with the threads on the edges of said plate, said rotary casing section being provided at one end with a series of circumferentially spaced graduations for indicating the diameter for which the tool is set and a series of correspondingly spaced teeth, and a spring pressed catch mounted in a recess provided therefor in said tool for sliding movement towards and away from said end of said rotary casing section and adapted to cooperate with the teeth thereof.

WILLIAM KYLE YOUNG.